May 14, 1957 — J. CHUDNER — 2,791,833
CUTTING BLADE ADJUSTER
Filed Jan. 5, 1956

INVENTOR.
Joseph Chudner
ATTORNEYS

United States Patent Office 2,791,833
Patented May 14, 1957

2,791,833
CUTTING BLADE ADJUSTER
Joseph Chudner, Brooklyn, N. Y.
Application January 5, 1956, Serial No. 557,513
5 Claims. (Cl. 30—266)

This invention relates to a device for constantly exerting a resilient clamping pressure on the cooperative cutting blades of an implement such as a clipper and the like.

The present invention may be used advantageously with an implement having blades connected face to face for pivotal movement toward and away from each other in which the sharpened cutting or shearing edges are caused to intersect each other and contactually cooperate to cut thread, string and other material, and which is especially effectual for cutting fine thread and filaments of all kinds.

An object of the present invention is the provision of a device of the indicated character which, combined with a pair of pivotally connected blades of an implement in proximity to the cutting edges of the blades and remote from the pivotal connection of the blades, constantly exerts a resilient clamping pressure on the blades and assures an effectual cutting action repeatedly by a simple and easy manipulation of the blades.

A further object of this invention is the provision of a device of the indicated character which enables adjustments to be made to compensate for exigencies of use and wear of the parts of a cutting implement equipped with said device.

With the foregoing, other objects and advantages of the invention will appear when the following description is read in conjunction with the accompanying drawing, in which Figure 1 is a side view of a clipper equipped with the device of the present invention.

Figure 1:
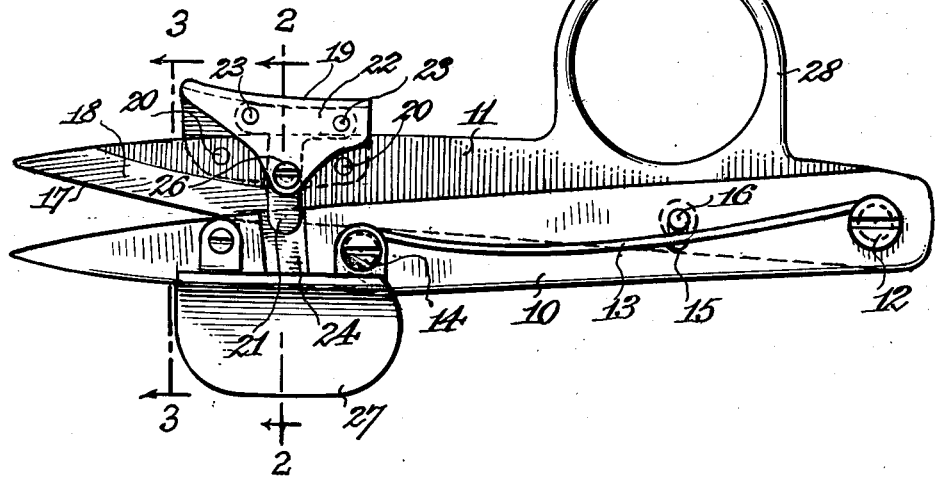
Figures 2, 3:
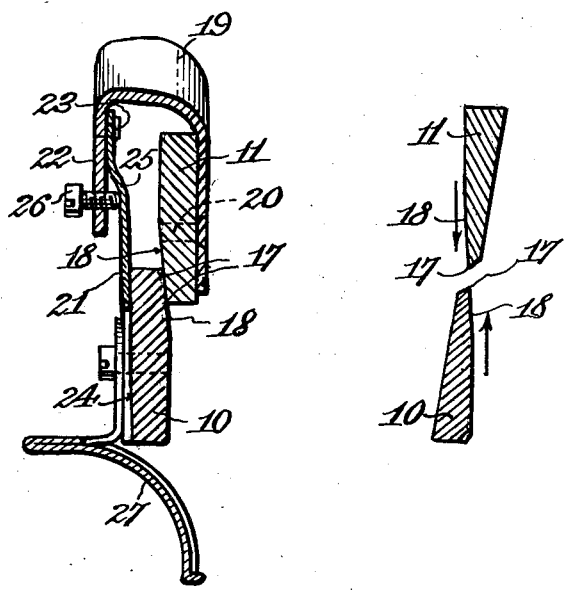
Fig. 2 is an enlarged sectional view taken on the line 2—2 and looking in the direction indicated by the arrows in Fig. 1.
Fig. 3 is an enlarged sectional view taken on the line 3—3 and looking in the direction indicated by the arrows in Fig. 1.

As shown in the drawing, the implement equipped with the device of the present invention comprises a pair of blades 10 and 11 which are laid together in a face to face relation. The blades are pivotally connected to each other by a machine screw 12 which is in threaded engagement with one end of the blade 10 and loose in the adjacent end of the blade 11. Therefore the blades may have pivotal movement toward and away from each other on the axis of the screw 12 which serves as a pivot, and the blades also may have a small amount of movement on an axis which is at a right angle to the axis of the screw 12. A spring 13 consisting of a length of stout steel wire has one end in engagement with the screw 12 and its opposite end is connected with the blade 10 by a screw 14. The blade 10 has a transverse slot 15 which receives a pin 16 which projects from the blade 11. The slot 15 and pin 16 limit the opening pivotal movement of the blades away from each other and the closing pivotal movement toward each other. The spring 13 bears on the pin 16 and causes the opening movement of the blades.

The tip end portions of the blades have cutting edges 17 respectively. Each edge 17 extends obliquely with respect to the longitudinal axis of the implement. When the blades are in their normal relation to each other the cutting edges 17 diverge toward the tip end of the implement. The meeting faces 18 of the blades at the cutting edges 17 are beveled slightly laterally inward. The edges 17 are caused to intersect each other as the blades are given closing movement toward each other in a cutting operation.

In accordance with the present invention use is made of a substantially U shaped support 19 which is fixed on the blade 11 in proximity to the cutting edges 17 by fasteners 20. A spring finger 21 is disposed over or across said cutting edges 17 and on the inside of a portion 22 of the support 19. One end of the finger 21 is secured to the portion 22 by fasteners 23, and the opposite end of the finger slidably and resiliently bears on a surface 24 of the blade 10, said surface 24 being approximately parallel to the face 18 of the blade 11. The finger 21 is bent to provide a seat 25 for a set screw 26 carried by the portion 22 of the support 19.

It will now be understood that the spring finger 21 arranged and secured in the manner described constantly exerts a clamping pressure in proximity to the cutting edges 17 and remote from the screw 12 which provides the pivot for the blades. Consequently, when the blades are given a closing movement toward each other, the cutting edges, by reason of the clamping pressure on the blades and the beveled faces 18 thereof, are always brought into an effectual coactive contactual engagement with each other throughout the length of the cutting edges as the latter intersect each other. In this operation the spring finger 21 riding on the inclined surface 24 compensates for the slight relative movement of the blades on the axis at a right angle to the axis of the screw 12 or longitudinal axes of the blades caused by the engagement of the beveled faces 18. The screw 12 may be adjusted to vary the amount of pressure exerted by the finger 21.

The support 19 serves as a finger abutment for the user of the implement. A thumb abutment 27 is fixedly secured to the blade 10 in cooperative relation to the abutment provided by the support 19 for the purpose of manipulating the blades. A ring 28 on the blade 11 accommodates the third finger of the user's hand so that the implement may be conveniently handled and operated. The use of the abutments and the ring is optional and not within the present invention.

I claim:

1. The combination with a cutting implement having a pair of cutting blades pivotally connected to each other so that the opposed cutting edges may cooperate in a cutting operation, of a device carried by one of said blades and having spring means which slidably and resiliently bears on the second one of said blades, thereby constantly exerting a clamping pressure on said blades in proximity to said cutting edges.

2. The combination as set forth in claim 1 wherein said blades are cooperatively beveled at the cutting edges, said second blade has a beveled surface substantially parallel to the aforesaid bevel of the blades at their cutting edges, and said means slidably and resiliently bears on said beveled surface of said second one of the blades.

3. The combination with a cutting implement having a pair of cutting blades pivotally connected to each other so that upon pivotal movement of the blades towards each other the opposed cutting edges of the blades intersect each other and contactually cooperate to cut, of a support fixed on one of said blades, a spring finger having one end secured to said support and its other end slidably and resiliently pressing on the second one of the blades in proximity to said cutting edges, thereby constantly exerting a clamping pressure on said blades in proximity to the cutting edges.

4. The combination as set forth in claim 3, and an adjustable member carried by said support bearing on said spring finger to vary the tension of the latter.

5. The combination with a cutting implement having a pair of cutting blades laid together face to face and having their adjacent root ends pivotally connected to each other so that the opposed cutting edges of the blades cooperate to cut material as the blades are given pivotal movement toward each other, said cutting edges being on the tip end portions respectively of the blades, a support fixed on the tip end portion of one of said blades, and a spring finger having one end secured to said support and its other end slidably and resiliently pressing on the tip end portion of the second one of said blades, thereby constantly exerting a clamping pressure on said blades in proximity to said cutting edges.

References Cited in the file of this patent

UNITED STATES PATENTS

| | | |
|---|---|---|
| 903,370 | Frey | Nov. 10, 1908 |
| 1,531,903 | Cummins | Mar. 31, 1925 |